US010061707B2

(12) United States Patent
Kutuva Rabindranath et al.

(10) Patent No.: US 10,061,707 B2
(45) Date of Patent: Aug. 28, 2018

(54) SPECULATIVE ENUMERATION OF BUS-DEVICE-FUNCTION ADDRESS SPACE

(71) Applicant: Intel Corporation, Santa Clara, CA (US)

(72) Inventors: Shanthanand Kutuva Rabindranath, Folsom, CA (US); David J. Harriman, Portland, OR (US); Prashant Sethi, Folsom, CA (US); Vijayalakshmi Kothandan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 15/079,922

(22) Filed: Mar. 24, 2016

(65) Prior Publication Data

US 2017/0185525 A1 Jun. 29, 2017

Related U.S. Application Data

(60) Provisional application No. 62/387,492, filed on Dec. 26, 2015.

(51) Int. Cl.
G06F 13/20 (2006.01)
G06F 12/10 (2016.01)
G06F 13/42 (2006.01)

(52) U.S. Cl.
CPC .......... G06F 12/10 (2013.01); G06F 13/4282 (2013.01); G06F 2212/65 (2013.01); G06F 2213/0026 (2013.01)

(58) Field of Classification Search
CPC ........... G06F 13/385; G06F 2213/0042; G06F 13/4045; G06F 2213/00; G06F 2213/0024; H04L 12/40123

(Continued)

(56) References Cited

U.S. PATENT DOCUMENTS 7,610,431 B1 10/2009 Watkins et al.
9,146,890 B1 9/2015 Brown et al.
(Continued)

FOREIGN PATENT DOCUMENTS

WO 2017112345 A1 6/2017

OTHER PUBLICATIONS

International Search Report and Written Opinion in International Patent Application No. PCT/US2016/063794 dated Mar. 10, 2017.

Primary Examiner — Tim T Vo
Assistant Examiner — Kim T Huynh
(74) Attorney, Agent, or Firm — Alliance IP, LLC

(57) ABSTRACT

A first device is determined as connected to a first one of a plurality of ports of a root complex. Addresses are assigned corresponding to a first hierarchy of devices including the first device. A second device is determined as connected through a mapping portal bridge at a second one of the ports of the root complex, the second device included in another second hierarchy of devices. A mapping table is generated that corresponds to the mapping portal bridge. The mapping table defines a translation between addressing used in a first view of a configuration address space of the system and addressing used in a second view of the configuration address space. The first view includes a view of the root complex and the second view includes a view corresponding to the second hierarchy of devices, the first hierarchy of devices being addressed according to the first view.

20 Claims, 14 Drawing Sheets

(58) Field of Classification Search
USPC .................................. 710/300–306, 313, 100
See application file for complete search history.

(56) References Cited

U.S. PATENT DOCUMENTS

| | | | |
|---|---|---|---|
| 2006/0242352 | A1 | 10/2006 | Torudbakken et al. |
| 2007/0294444 | A1* | 12/2007 | Panesar ............... G06F 13/4221 710/104 |
| 2011/0219164 | A1* | 9/2011 | Suzuki .................... G06F 13/12 710/316 |

* cited by examiner

SPECULATIVE ENUMERATION OF BUS-DEVICE-FUNCTION ADDRESS SPACE

This application claims benefit to U.S. Provisional Patent Application Ser. No. 62/387,492, filed Dec. 26, 2015 and incorporated by reference herein in its entirety.

FIELD

This disclosure pertains to computing system, and in particular (but not exclusively) to address space mapping.

BACKGROUND

Peripheral Component Interconnect (PCI) configuration space is utilized by systems employing PCI, PCI-X, and PCI Express (PCIe) to perform configuration tasks of PCI-based devices. PCI-based devices have an address space for device configuration registers referred to as configuration space and PCI Express introduces extended configuration space for devices. Configuration space registers are typically mapped to memory mapped input/output locations by the host processor. Device drivers, operating systems, and diagnostic software access the configuration space and can read and write information to configuration space registers.

One of the improvements the PCI Local Bus had over other I/O architectures was its configuration mechanism. In addition to the normal memory-mapped and I/O port spaces, each device function on the bus has a configuration space, which is 256 bytes long, addressable by knowing the eight-bit PCI bus, five-bit device, and three-bit function numbers for the device (commonly referred to as the BDF or B/D/F, as abbreviated from bus/device/function). This allows up to 256 buses, each with up to 32 devices, each supporting eight functions. A single PCI expansion card can respond as a device and can implement at least function number zero. The first 64 bytes of configuration space are standardized; the remainder are available specification defined extensions and/or for vendor-defined purposes.

In order to allow more parts of configuration space to be standardized without conflicting with existing uses, there can be a list of capabilities defined within the first 192 bytes of Peripheral Component Interface configuration space. Each capability has one byte that describes which capability it is, and one byte to point to the next capability. The number of additional bytes depends on the capability ID. If capabilities are being used, a bit in the Status register is set, and a pointer to the first in a linked list of capabilities is provided. Previous versions of PCIe have been provided with similar features, such as a PCIe extended capabilities structure.

DETAILED DESCRIPTION

Figure 1:
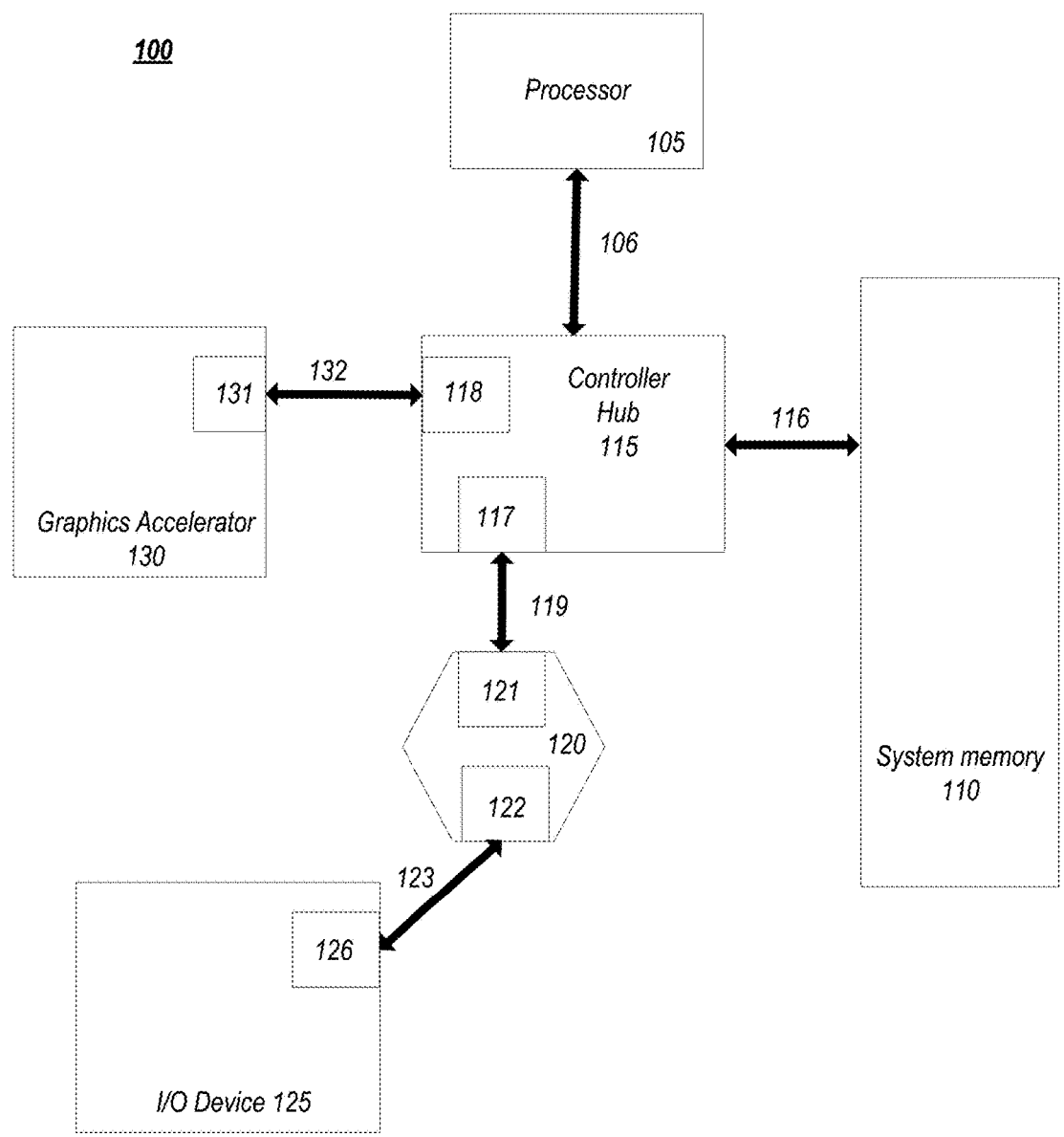
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
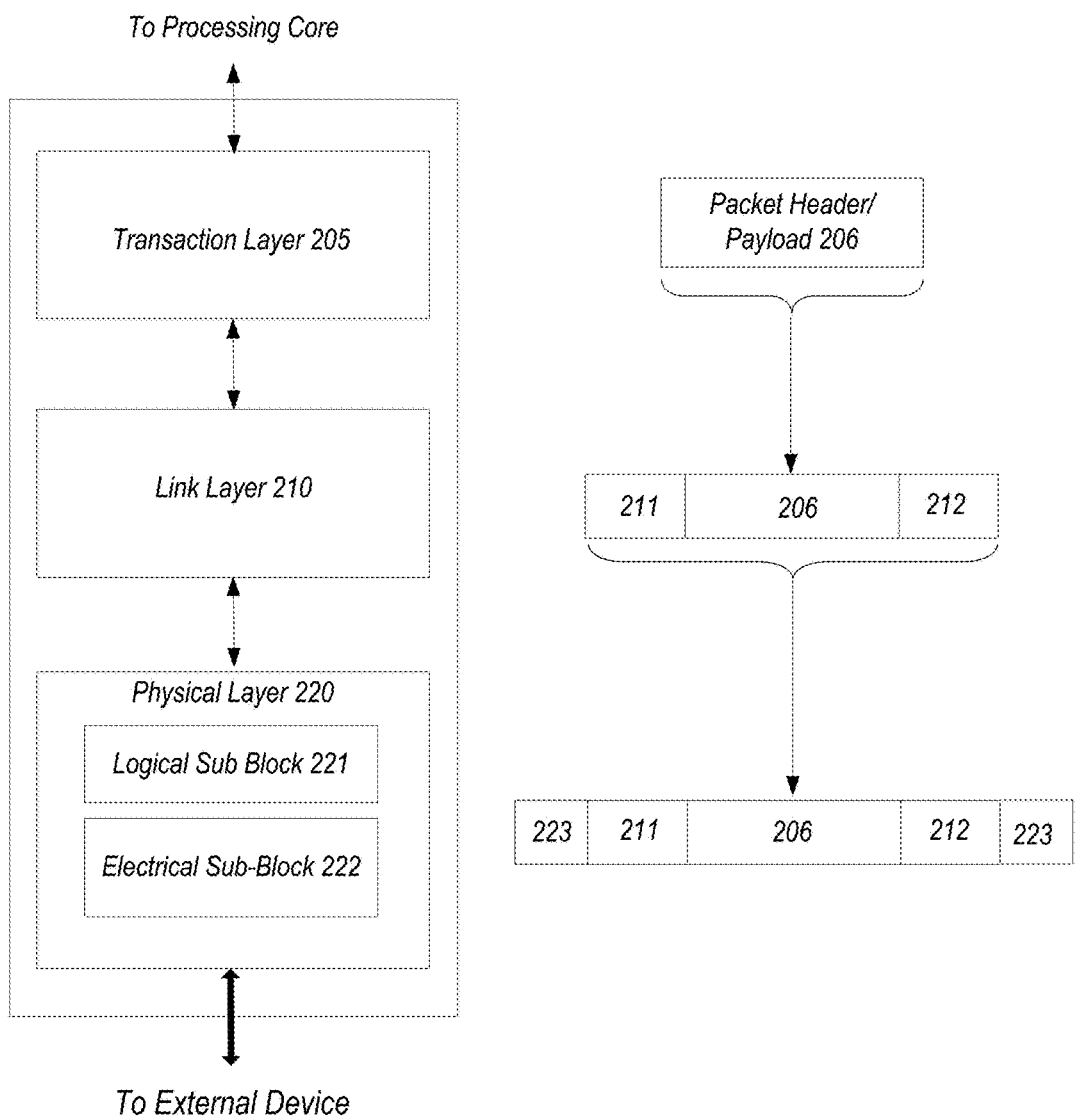
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
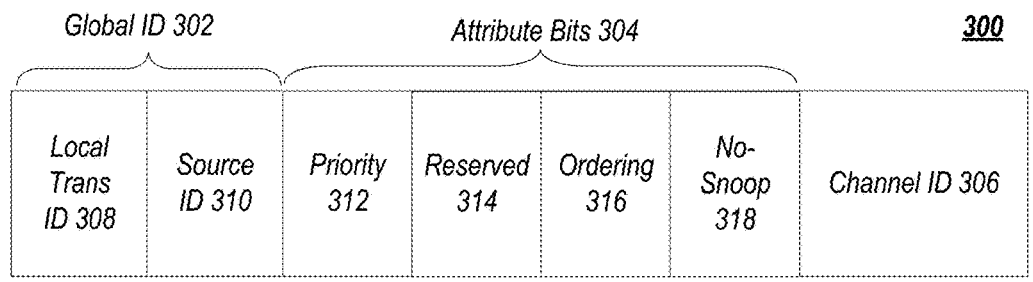
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
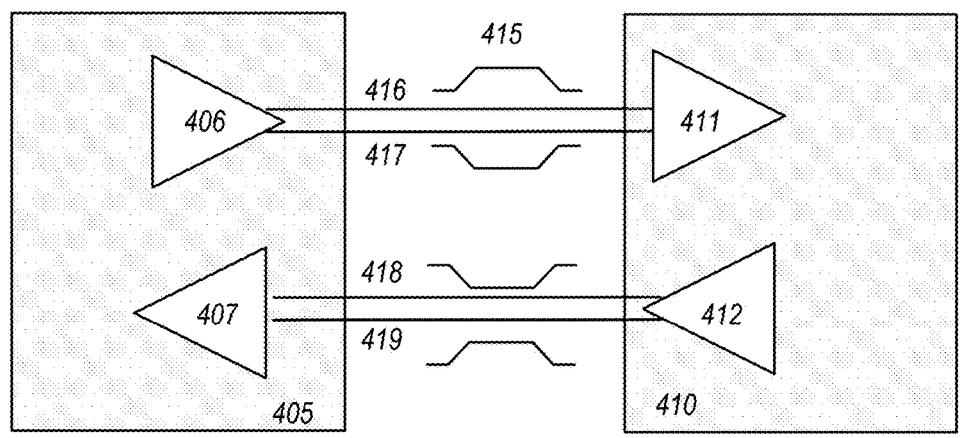
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

New and growing use models, such as PCIe-based storage arrays and Thunderbolt, are driving a significant increase in PCIe hierarchy depth and width. The PCI Express (PCIe) architecture was based on PCI, which defines a "Configuration Space" in which system firmware and/or software discover Functions and enable/disable/control them. The addressing within this space is based on a 16 bit address (commonly referred to as the "BDF", or bus-device-function number) consisting of an 8 bit Bus Number, a 5 bit Device Number, and a 3 bit Function Number.

Figure 5:
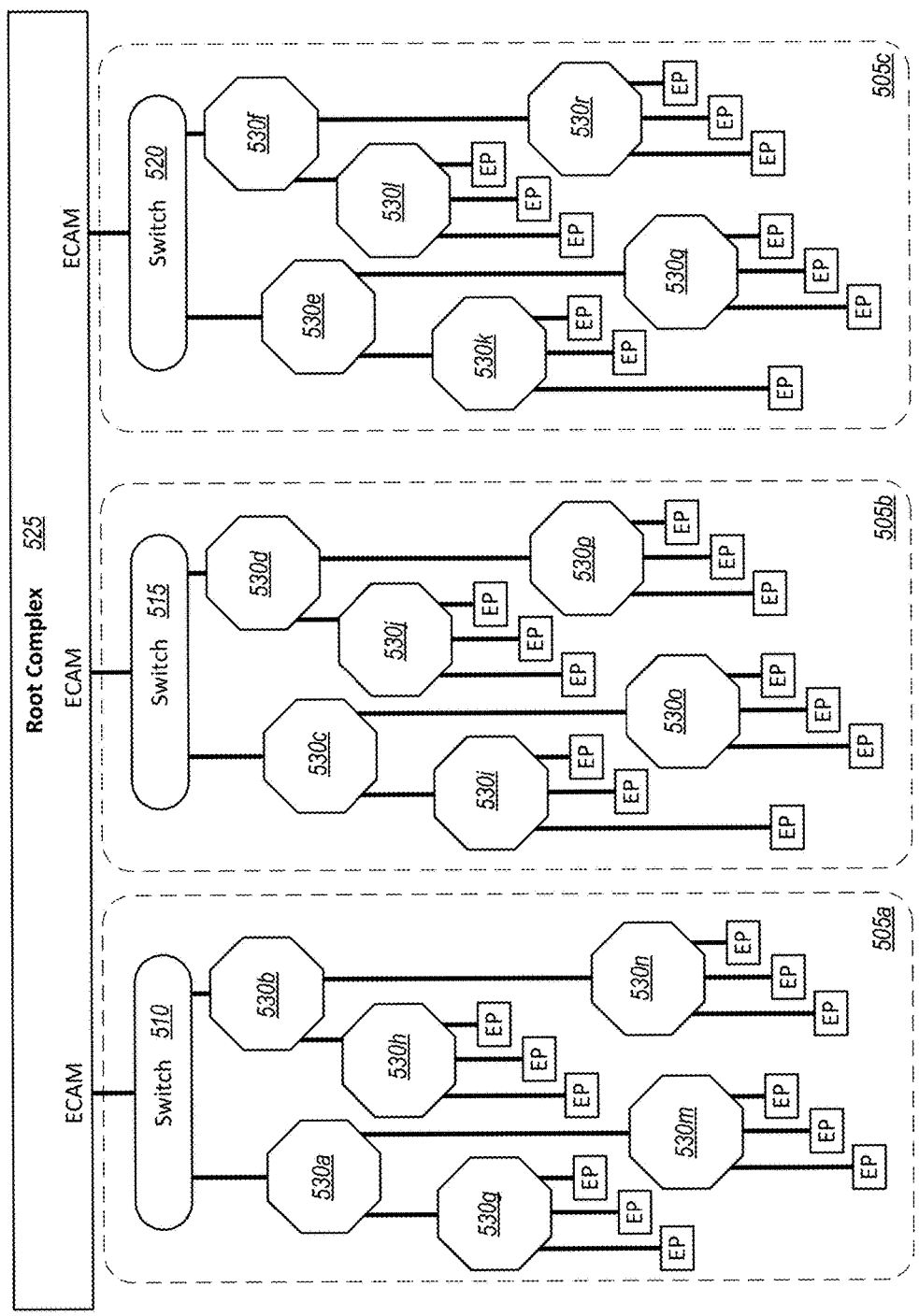
FIG. 5 illustrates a representation of system buses.

PCI allows systems to provide for multiple, independent BDF spaces, which are called "Segments". Each Segment may have certain resource requirements, such as a mechanism for generating PCI/PCIe Configuration Requests, including the Enhanced Configuration Access Mechanism (ECAM) defined in the PCIe specification. Additionally, input/output (I/O) memory management units (IOMMUs) (such as Intel VT-d) can use BDF space as an index, but may not be configured to directly comprehend Segments. Accordingly, in some instances, a separate ECAM and IOMMU must be duplicated for each Segment defined in a system. FIG. 5 illustrates an example of a system including multiple segments (e.g., 505*a-c*). For instance, a Segment, in this example, is defined for each one of three switches 510, 515, 520 that connect to a Root Complex 525. A separate IOMMU and ECAM can be implemented at the Root Complex 525 to facilitate each of the Segments (e.g., 505*a-c*). Further, in this example, a variety of switches (e.g., 530*a-r*), a variety of endpoints (EP), and other devices are connected to various buses in each Segment. In some cases, configuration space of a Segment may reserve multiple bus addresses for potential hot plug events, limiting the total number of bus addresses that are available within each Segment. Still further, allocation of bus numbers in one or more of the Segments may be according to an algorithm that concerns itself little with densely populating the addresses and making compact use of the available bus address space. This can result in wasted configuration address (i.e., BDF) space in some instances.

Traditional PCIe systems are configured to assign address space in a manner that, when applied to modern and emerging use cases, tends to make inefficient use of BDF space and of Bus Numbers in particular. While relatively few implementations may actually involve a single system consuming all of the unique BDF values (e.g., 64K defined under PCIe), deep hierarchies such as those that occur, for example, in deep hierarchies of PCIe Switches, may use up available Bus Numbers within the BDF space very quickly. Additionally, in applications supporting hot plugging, large portions of the BDF space may be typically reserved for future potential use (i.e., when a future device is hot plugged to the system), taking additional swaths of Bus Numbers from the pool immediately usable by a system. While Segment mechanisms can be applied to address this issue, Segments themselves have poor scaling because, as noted above, additional hardware resources (e.g., IOMMUs) are to be built into the CPU, platform controller hub (PCH), system on chip (SoC), root complex, etc., in order to support each segment. Thus, using Segments to address deep hierarchies results in scaling the system to satisfy a worst case system requirement, which is typically much more than what would be needed for most systems, resulting in significant waste of platform resources. Further, Segments can be difficult (and, in some cases, essentially impossible) to create outside of a root complex of the system, among other examples issues.

Figure 6:
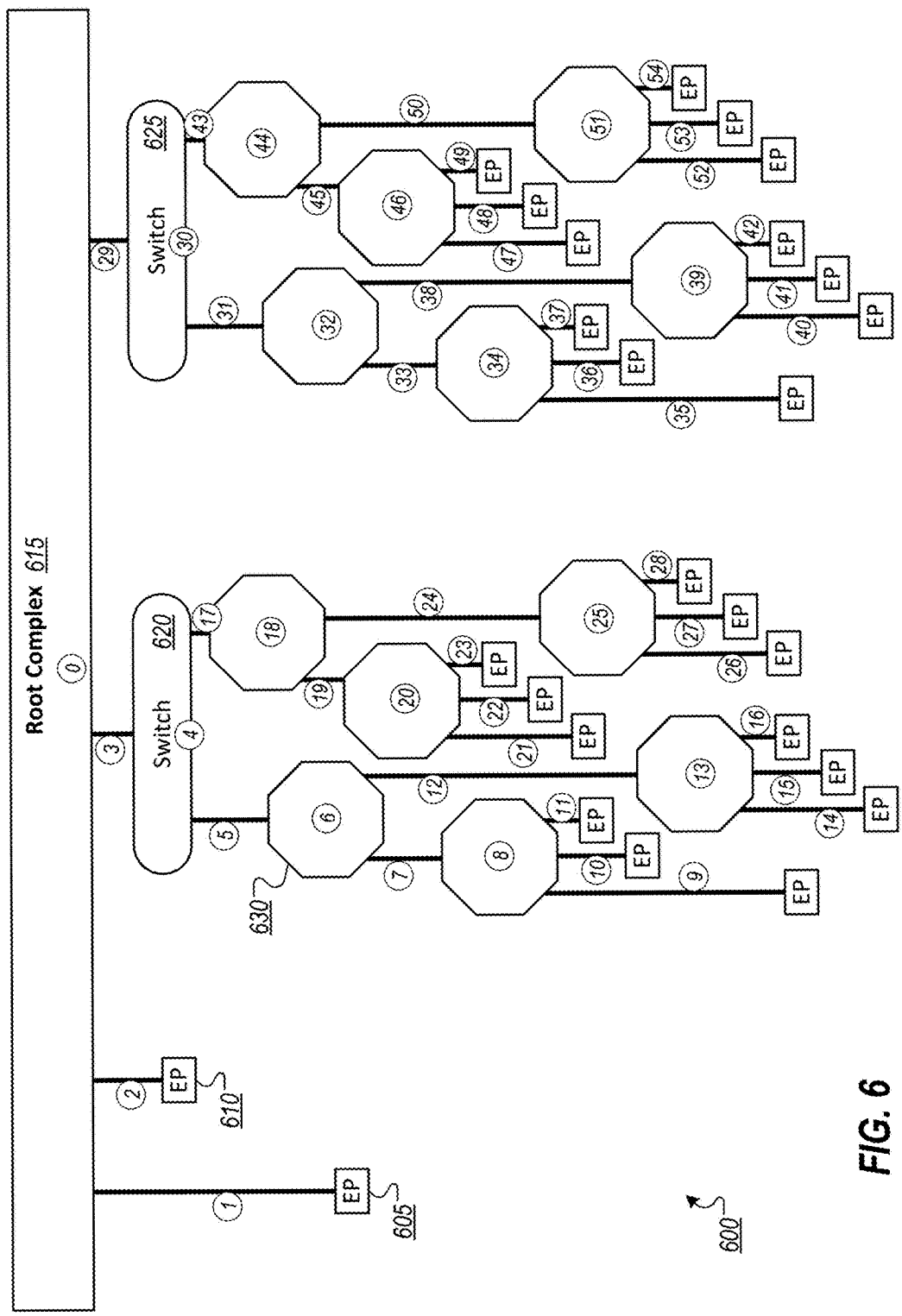
FIG. 6 illustrates a representation of an example enumeration of bus identifiers in a system.

In some implementations, a system can be provided to enable more efficient use of BDF space and address at least some of the example issues above. Among other example advantages, this can allow for the expansion of PCIe, Thunderbolt, system on chip fabrics (e.g., Intel On-Chip System Fabric (IOSF) and others), and other interconnects to very large topologies, but without requiring dedicated resources in the Root Complex, as would be the case in solutions relying exclusively on Segments or other alternatives. FIG. 6 shows a simplified block diagram 600 illustrating an example system including a root complex 615 to which endpoints (e.g., 605, 610) and switches (e.g., 620, 625, 630) are connected by multiple buses forming hierarchies of switch fabrics. The example of FIG. 6 further illustrates an example assignment of bus numbers to buses within the system according to an example PCIe BDF assignment. In this example, a system with two directly connected devices 605, 610 directly connected to a Root Complex 615 and two Switch-based hierarchies (corresponding to switches 620, 625) are enumerated (or assigned) with approximately the densest possible Bus Number allocations (as designated by circle labels (e.g., 650*a-d*, etc.). In deep hierarchies, the available bus numbers in a single BDF space can be quickly consumed. Further, real world systems typically allocate bus numbers far less efficiently, resulting in sparse (or "wasted") allocation of the BDF space.

Another problem with use cases that support hot add/remove such as Thunderbolt and, in some cases, PCIe-based storage, is that the Bus Number assignments in BDF space are "rebalanced" to address hardware topology changes occurring in a running system. Rebalancing, however, can be very difficult for system software to do because, in typical cases, all PCI Functions are then forced into a quiescent state in connection with the rebalancing in order to allow the BDF space to be re-enumerated by the system, followed by the re-enabling of the PCI Functions. This process can be quite slow, however, and typically results in the system freezing for what can, in the worst case, be very long periods of time (e.g., long enough to be disruptive to running applications, and easily visible to the end user). An improved system can also be provided to shorten the time it takes to apply a revised BDF space such that the rebalancing process can be performed in a span of hundredths of milliseconds or quicker and without explicitly placing PCI Functions into quiescent states.

Finally, very large systems or systems with (proprietary) mechanisms for supporting multiple Root Complexes, may be defined to use Segments. An improved system can also be applied within such use cases to provide for the management of devices with a minimum of change relative to what would be implemented using a single-Root system. Specifically, an improved system can provide a mapping portal bridge (MPB) implemented using hardware (and/or software) logic of one or more devices in a system to provides multiple views of a BDF space and remapping tables to enable a "bridge" (which is the logical view of a Root or Switch Port) to translate one view of a BDF space into another, in both directions across the bridge, to effectively create a virtual Segment.

A mapping portal bridge (MPB) can be implemented as blocks of logic (implemented in hardware, firmware, and/or software) provided at one or more ports of a root hub or switch to enable translation between two or more defined BDF spaces, for instance, a primary and a secondary BDF space, in some implementations. An MPB can be implemented in Root Ports and/or Switch Ports, with a consistent software model (e.g., utilized by system software), and can be implemented recursively within a given topology, allowing high degree of scalability. Further, a MPB need not be tied to a particular use model (e.g., it can be alternatively used in either or both Thunderbolt (TBT) and regular PCIe use cases). Additionally, MPB implementations can support implementation flexibility and engineering price/performance tradeoffs. Further, consistency in an existing PCIe system software stack can be maintained, among other example advantages.

The MPB utilizes a mapping mechanism that allows the MPB to map all PCIe Packets flowing across the MPB between a BDF primary space and a BDF secondary space. The BDF primary space refers to the view of the Configuration Address space seen on the primary side of the bridge (i.e., the side closer to the host CPU (e.g., at the root complex)). The BDF secondary space can refer to the view of the Configuration Address space created and managed for devices on the secondary side of the bridge (e.g., the side closer to the devices and downstream from the root complex or CPU). In PCIe, the same BDF assignments used for device configuration may also be used to identify the source (and sometimes destination) of packets, report errors, and to perform other functions.

Figure 7:
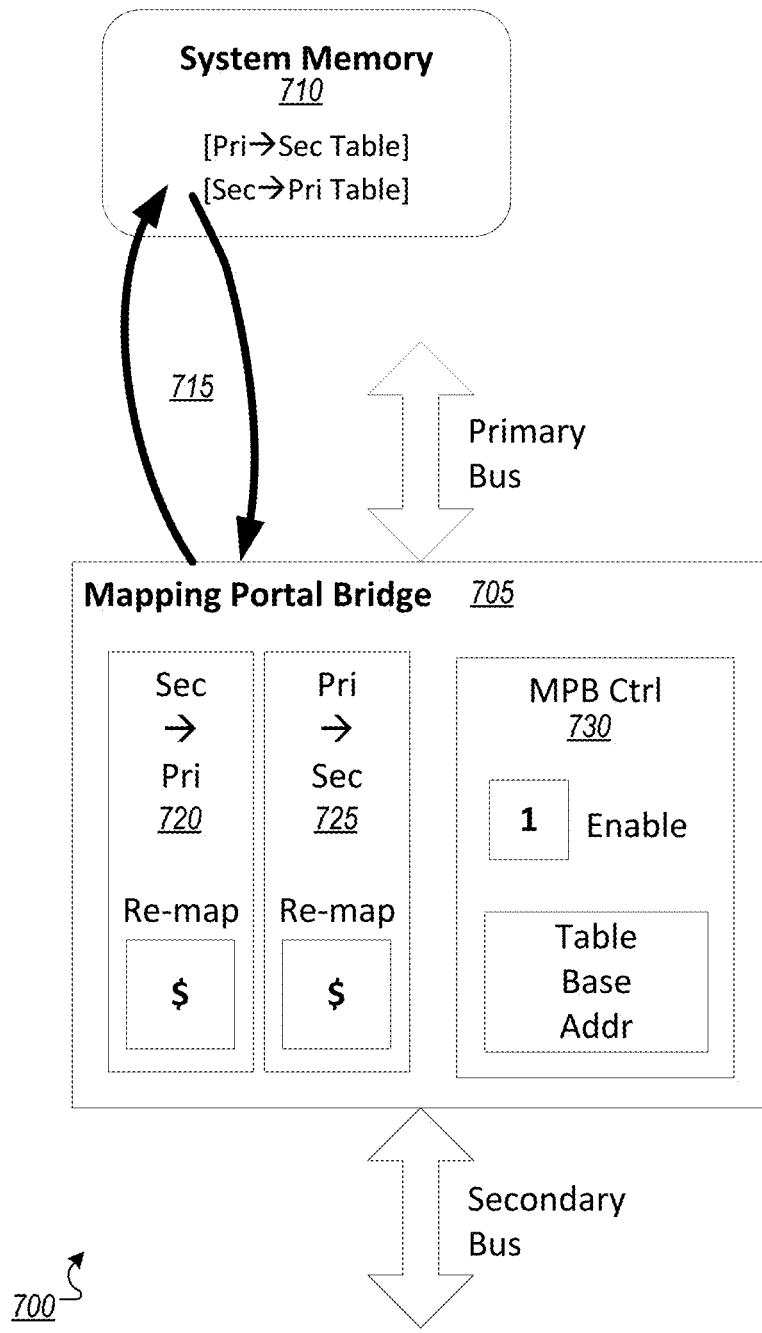
FIG. 7 illustrates an embodiment of a mapping portal bridge (MPB).

FIG. 7 illustrates a block diagram 700 representing an example implementation of an MPB 705. The MPB 705 can include a pointer to and/or a (full or partial) local copy of two mapping tables, one for secondary address space to primary address space mapping (BDFsec→BDFpri) and another for primary address space to secondary address space mapping (BDFpri→BDFsec). The mapping tables, in one example, can be stored in system memory 710, in which case the MPB 705 (and system software) can read the tables from system memory (at 715) and/or maintain local copies (720, 725) of at least a portion of each mapping table (i.e., BDFsec→BDFpri and BDFpri→BDFsec) (e.g., to enhance performance). In still other examples, the BDFsec→BDFpri and BDFpri→BDFsec mapping tables can be stored directly in the MPB 705 without maintaining copies in system memory 710. The MPB 705 can further perform and manage translations between the primary BDF space and one or more BDFsec spaces. In the case of multiple BDFsec spaces, a single mapping table can be used that includes a column to map not only the BDFsec address, but also the particular one of the BDFsec spaces to a BDFpri address. In other cases, separate mapping tables can be maintained for each BDFsec space. The MPB can be implemented in hardware of a switch, hub, or port, such as a port of a root complex. The MPB 705 can also include control logic 730 to enable/disable the mapping functionality (e.g., to selectively configure MPB 705 as an option on various ports of a switch or root complex, among other examples).

An MPB 705, in some instances, can be configured to flexibly operate as either an MPB 705 (utilizing the primary/secondary BDF space mapping mechanism) or a conventional bridge (e.g., utilizing traditional PCIe BDF addressing) (e.g., using control logic 730). When system software intends to enable an MPB 705, it can configure the MPB to provide a unique one-to-one mapping between Primary (BDFpri) and Secondary (BDFsec) BDF addresses. In other words, a single primary side BDF can correspond to a single secondary side BDF. Among other example advantages, this constraint can ensure that the MPB does not track outstanding requests, as such tracking would add significant cost to the MPB. In some implementations, multiple MPBs can be deployed in a system. For instance, a separate MPB 705 can be provided for each BDFsec space. In such cases, the BDFsec assignments behind these multiple different MPBs can be permitted to (and likely will) reuse the same BDF values (in their respective second BDF spaces), provided these are mapped to unique values in the BDFpri space.

Figure 8:
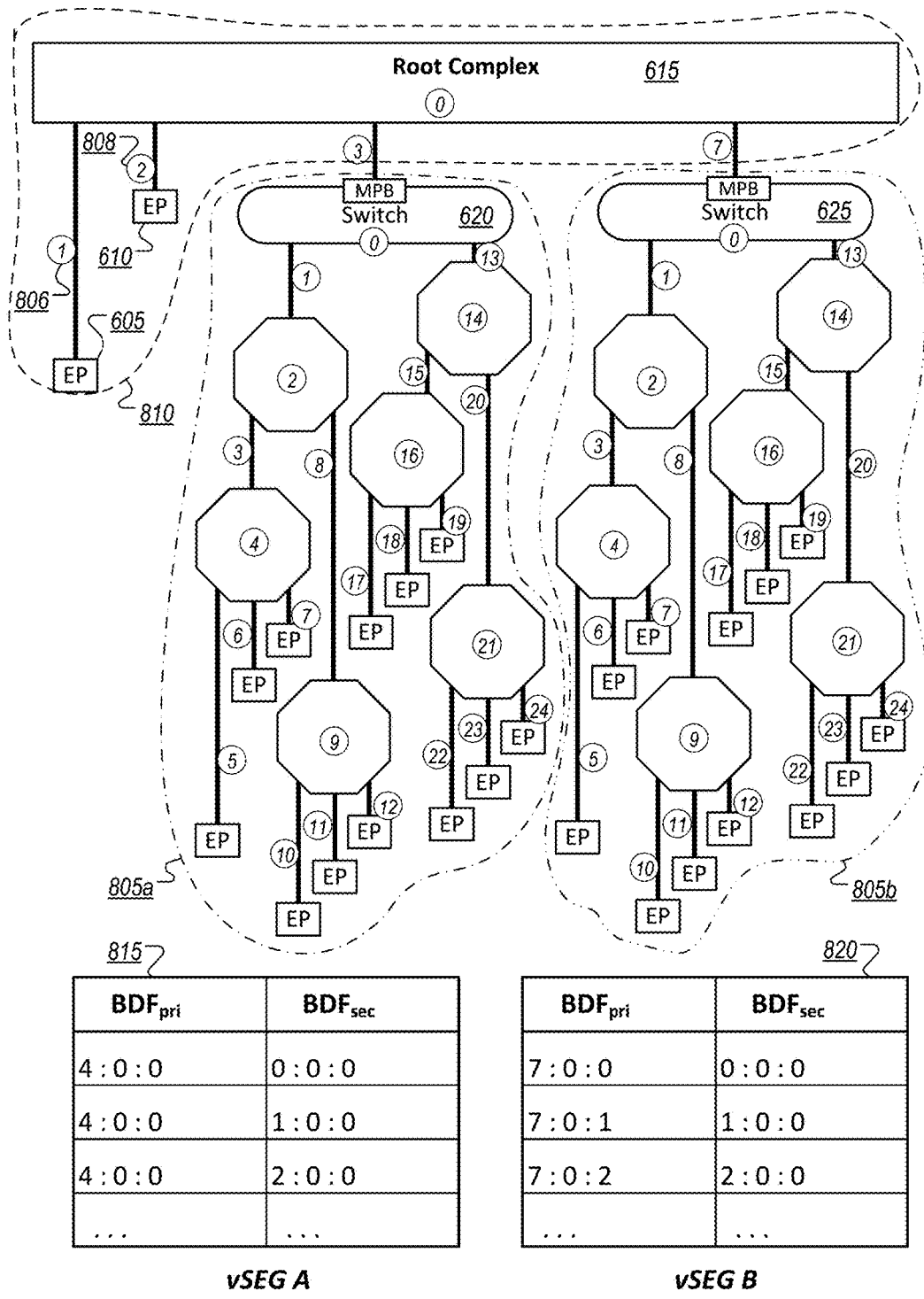
FIG. 8 illustrates a representation of enumeration of bus identifiers in a system and corresponding address mappings.

FIG. 8 is a simplified block diagram showing the example of FIG. 6 modified through the use of MPB(s) enabling a BDFpri space/BDFsec space dichotomy. For instance, FIG. 8 shows, how the BDFsec spaces may be assigned in a system with two MPB's (a first MPB used to implement virtual segment (vSEG) A (805a) and a second MPB used to implement vSEG B (805b). In this example, Bus Numbers 1 and 2 (at 806, 808) of the Root Complex 625 can be maintained in BDFpri space (810) and assigned to the two directly connected devices 605, 610. Hierarchies of connections from busses 3-n, in this example, can be dealt with through BDF sec spaces (corresponding to vSEG A (805a) and vSEG B (805b)) and one or more corresponding MPBs. For instance, busses 3-6 can be enumerated toward a BDFsec space vSEG A (805a), thereby providing a virtual segment to the buses and devices connecting to the root complex through busses 3-6. A second virtual segment can be provided by defining a second BDFsec space vSEG B (805b) incorporating buses and devices connecting to the root complex through busses 7-n. Each BDFsec space can be allocated BDF addresses (and bus numbering) within the respective second space according to any suitable scheme, including schemes that allocate these addresses inefficiently. Indeed, different BDFsec spaces can allocate addresses differently based on the types of endpoints or routing devices connected to the corresponding busses. Unlike the BDFsec spaces, the BDFpri space (i.e., the view of the configuration space enjoyed by the root complex), can be optimized to allow for and control compact and efficient allocation of bus addresses within the space (e.g., as illustrated in the example of FIG. 6).

Each BDFsec address in each of vSEG A and vSEG B can map to exactly one BDF address is BDFpri space (e.g., according to mappings 815, 820). As an example, a first device within the vSEG A can be assigned BDF "1:0:0" within the vSEG A BDFsec space, which is mapped to primary BDF "4:0:0" (as shown in mapping 815), among other examples. Different devices in other BDFsec spaces of the system (e.g., vSEG B), can assign the same BDFsec values as assigned in other BDFsec spaces (e.g., vSEG A). For instance, a second device, within vSEG B, can also be assigned BDF "1:0:0", but within the BDFsec of vSEG B. The second device, however, will be mapped to a different BDF within the BDFpri of the system (i.e., BDF "7:0:1", as shown in mapping 820), and so on.

As noted above, in some implementations, the mapping(s) between BDFpri and BDFsec spaces can be accomplished through mapping tables based in system memory. Different packet types may be mapped (i.e., to pass between BDFsec and BDFpri spaces) differently. For instance, for Requests in both directions, the corresponding Requester ID can be remapped (e.g., according to the appropriate mapping table). Configuration & ID Routed Message Requests can be routed by ID Bus/Device/Function Number fields. Completions in both directions can be routed by Requester and Completer IDs, among other examples.

The mapping hardware of the MPB can access mapping tables located in system memory, with optional caching in the MPB. In some implementations, a single mapping table can be used for traffic in both directions, with the MPB possessing logic to determine mapping in the forward (e.g., downstream) and the reverse (e.g., upstream) (e.g., through reverse look-up operations) directions. In other implementations, it can be more efficient to provide two separate mapping tables per MPB, one for the forward direction and the other for the reverse direction. This can be less expensive than providing MPB hardware to perform a reverse-lookup in one of the two directions in some instances.

An MPB, at the primary side (e.g., the port closest to the Root Complex), can be responsible for mapping a subset of the bus numbers of BDFpri space to a corresponding BDFsec space. Accordingly, the range of Bus Numbers in BDFpri space assigned to the MPB may be limited to the range indicated by [Secondary Bus Number to Subordinate Bus Number], because in the BDFpri space only packets in that range will ever be directed to that respective MPB. Thus the table for mapping BDFsec:BDFpri may involve a translation table large enough to cover the Secondary to Subordinate range of Bus Numbers, but not necessarily larger. In some embodiments, a default 64K entry table can be provided for simplicity in implementation. Indeed, for mapping BDFpri to BDFsec, a 64K entry translation table can be provided to make the full BDF space available on the secondary side, but this can be constrained in some alternatives to reduce hardware/memory requirements.

Mapping tables can be maintained by system software governing data communication in PCIe (or other interconnects implementing these features). For instance, in implementations utilizing two separate upstream and downstream tables, the two tables may be maintained by system software. The system software can ensure consistency between the tables such that a mapping of BDFx→BDFy→BDFx' always gives the result that x=x', among other example considerations.

In some implementations, an MPB can implement a cache to store at least a portion of the mapping tables locally at the MPB. System software can assume that MPBs cache translations are based on the mapping tables and can support cache management by providing the necessary cache management information to the hardware. It may be desirable to provide mechanisms for system software to ensure that the MPB cache is updated only under system software control. Further, a mechanism can be defined, such as a specific register(s) in MPB memory-mapped I/O (MMIO) space, to provide pointers to the mapping tables in system memory.

Registers can also be used for cache management, for system software to enable/disable caching, invalidating the MPB cache, etc. Alternately, in some implementations, the tables can be implemented directly in the MPB without maintaining copies in system memory. In this case, system software directly updates the tables at the MPB as required.

An additional benefit of the MPB mapping table mechanism is that system software can be executed to update the mapping tables atomically, for instance, by creating new mapping tables and then "instantly" invaliding the MPB cache and redirecting the MPB from the old to the new tables. This can be done by defining the control register mechanism such that the MPB hardware is required to sample the register settings when indicated to do so by system software, and then continue operating with the sampled settings until instructed to re-sample. This re-sampling can be performed by MPB hardware in such a way that the transition from the old to the new sample takes effect atomically. By also providing a mechanism for system software to temporarily block traffic through the MPB (e.g., to "pause" traffic at the MPB to allow for changes to the mapping tables), it becomes much more attractive to allow system software to modify the bus number assignments ("rebalance") in a running system, because the amount of time it takes to switch over the mapping tables can be kept quite short. Alternately, if the mapping tables are maintained directly in the MPB, a mechanism can be employed such as double-buffering which enables the MPB to operate using one copy of the tables while an alternate set is updated by system software, and then under system software direction, the MPB transitions to operating with the updated tables (e.g., while local tables are replaced with the updated versions).

Figure 9:
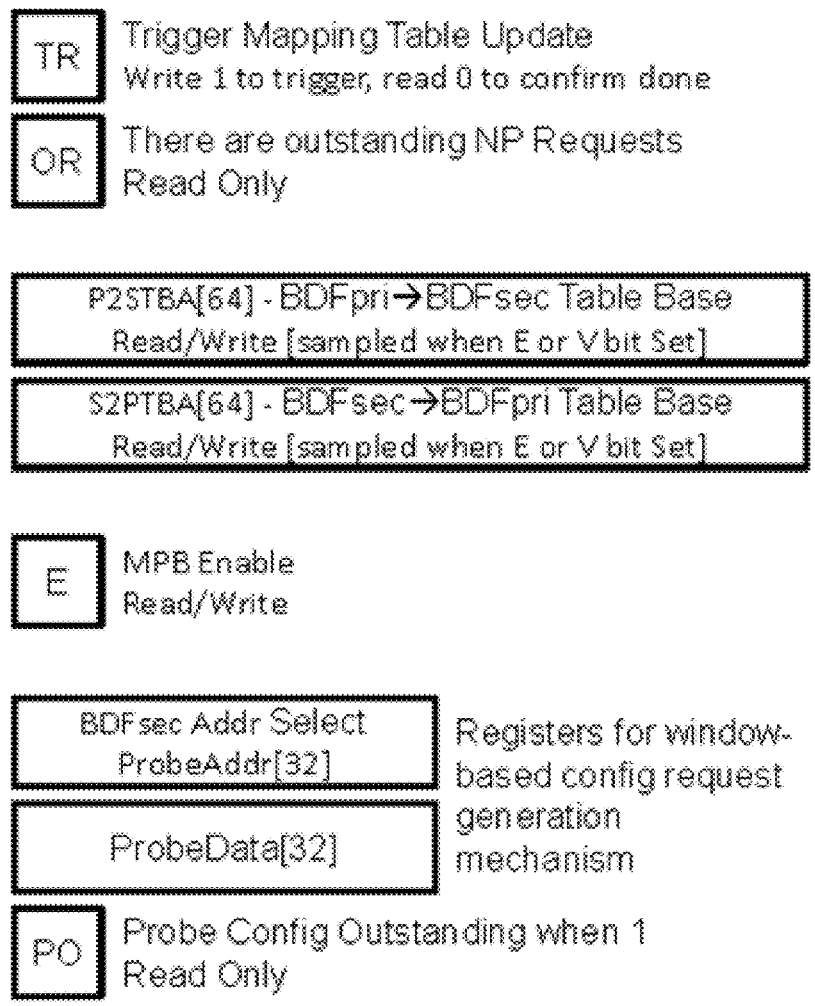
FIG. 9 illustrates a representation of at least a portion of an example capability register.

Turning to FIG. 9, a representation is shown of an example embodiment of the register fields and bits for use in implementing the hardware/software interface for an example MPB. Specifically, in this particular example, a PCIe Extended Capability can be defined for discovery/management in an MPB system. The extended capability can include fields such as: an Outstanding Requests (OR) field reflecting MPB count of non-posted (NP) requests in either direction (although the non-posted requests would not be specifically or individually tracked); an MPB enable (E) bit to indicate whether MPB functionality is enabled at a bridge supporting MPB (where address registers are to be sampled by MPB when E bit Set (0→1)); and a mapping table update trigger field (TR), among other examples. In some cases, additional fields can be used in connection with a window mechanism for generating "probe" configRequests behind MPB, such as a status bit so system software can comprehend when ConfigWrites complete. In some cases, the window mechanism may only support one ConfigRequest at a time (e.g., no pipelined requests). In still other examples, the capability structure can provide values to describe the nature of local translation tables maintained at an MPB (e.g., to indicate the size of the table if not full size, etc.), among other examples.

BDF primary/secondary mapping and MPBs can be used in conjunction with Segments in some implementations. As noted above, MPBs can be used to implement Virtual Segments (vSEGs) to at least partially replace and reduce the number of Segments in a system design. In cases where Segments are to be included, or when a multi-root system is created (e.g., using a proprietary load/store fabric), MPBs can be extended to support mapping between different Segments and between parts of a hierarchy that do not support Segments. For example, in a system where the BDFpri is augmented to support Segments, this in effect becomes a Segment's BDFpri (SBDFpri) space, because the Segment acts as a "prefix" to increase the number of Bus Numbers available. In such a system a mechanism such as a TLP Prefix could be used to identify specific Segments. However since many devices do not yet support a Segment tagging mechanism, the MPB mapping mechanism, with extensions, can be used to support mapping a BDFsec space that does not support Segment tagging into an SBDFpri space that does support Segment tagging, among other examples.

Probing can be accommodated by MPBs in some implementations. Here, "probing" can refer to reading the first data word (DW) of a function's configuration space to see if there is a valid Vendor/DeviceID. Using the in-memory tables during probing, however, can involve repeated updates, which has the potentially of being particularly problematic if probing is done during runtime due to repeated updating of the mapping tables that may take place. To avoid this, a mechanism can be provided to generate configuration requests through the MPB for probing. This mechanism may not be intended for use as the normal configuration generation path, but may instead be configured for probing (and some instances also as a "failsafe"). In one example, the mechanism can include a windowing mechanism in the Extended MPB Capability (e.g., based on the CFC/CF8 configuration access mechanism defined for PCI, extended with support for 4K configuration space). System software can use this mechanism to discover a Function, for example, by probing. Upon discovery of a function, system software can then update the mapping tables to provide translation for the Function, and proceed with further enumeration/configuration through the table-based translation mechanism of the MPB, among other examples features.

System software can enumerate BDFsec space according to any suitable or customary algorithm. In some cases, before a specific BDF on the secondary side can be initially probed, the enumerator configures the MPB to assign a "key" in BDFpri. This key can be used to generate and remap the Configuration Requests to that specific BDF. The enumerator must "understand" the BDFpri:BDFsec mapping during this initial enumeration, and can provide services to all modules using the BDF to perform this mapping during system operation. In one example, an algorithm can be used by system software to enumerate PCI devices under a Mapping Portal Bridge (MPB).

The scalability limitations of resource allocations by the traditional PCI enumeration algorithm is clearly evident in usage scenarios for PCI based SSDs devices (for example, based on NVMe) and in Thunderbolt hierarchies, where these limitations do not allow large/deep hierarchies to be configured. This creates errors where the user is unable to use devices in such configurations. For example, there could be situations where more than 256 PCI based solid state drives need to be connected to a single system or there could be hot-plugged devices such as that for Thunderbolt where the resources reserved for a given portion of the tree are insufficient to configure the hot-plugged Thunderbolt devices. In these scenarios, the traditional PCI enumeration algorithm depletes the scares BDF resource very quickly due to allocation mechanisms such as equally dividing and allocating the available bus numbers among all hot plug capable ports. The traditional approach of using rebalancing to redistribute resources, as discussed earlier, is not suitable for many use cases. The new algorithm proposed in this disclosure addresses these limitations in conjunction with the MPB to significantly improve resource configuration and scalability in such scenarios.

Traditional resource enumeration algorithms may not be capable of enumerating addresses (e.g., BDFs) for devices that are present under a Mapping Portal Bridge (MPB) as the traditional enumeration algorithms do not have visibility into how to properly map these devices between the secondary and primary BDF spaces. Traditionally, PCI devices are enumerated by the system software scanning the PCI bus with Bus-Device-Function (BDF) numbers starting from BDF [0, 0, 0] to BDF [255, 31, 7]. In traditional enumeration techniques, for each BDF that may potentially correspond to a PCI Function, the system software generates a Configuration Read Transaction to read the Vendor and Device ID of that particular function. A valid Vendor and Device ID from the Configuration Read can indicate the presence of a function at that Bus-Device-Function (BDF). Each PCI device can be required to implement function 0. Because of this, the system software may have the liberty to skip the device's function numbers if function 0 of the device is not implemented. This traditional enumeration algorithm does not work on devices that are present under a Mapping Portal Bridge (MPB) due to a potential remap of bus, device and function numbers. Accordingly, an enhanced enumeration algorithm can be provided, usable by system software, to determine the presence of an MPB and enumerate devices that are present under the MPB.

As noted above, each logical function in a PCI subsystem may be identified by a BDF triplet composed of Bus (0-255), Device (0-31) and Function Number (0-7). The BDF is a form of address that uniquely identifies each logical function within a PCI system. A PCI system, or "subsystem" (e.g., a subsystem of a broader system including non-PCI subsystems), can have 256 bus numbers within a Segment. Each bus in PCI subsystem can have 32 devices and each device can have 8 functions. Traditionally, in order to enumerate these devices, system software scans through these Bus, Device, and Function numbers. Enumeration can be performed by selecting a specific BDF and reading the Vendor/Device ID as discussed above. Based on the results of the Vendor/Device ID read, system software can note the results and perform additional configuration space tasks based on the requirements of the specific device/function and on the policies established for the particular system. For each BDF combination, the system software generates a Configuration Read Transaction to read the Vendor and Device ID of that function. A valid response from this Configuration Read Transaction indicates the presence of a function at that BDF. If a valid response is not received system software can make a note of this and this BDF may be unused (unless a device is added and makes use of this BDF at a later time (e.g., a hot add)).

The PCI protocol uses a window mechanism to forward transactions from the primary side of a bridge to the secondary side of a bridge. Because of this window mechanism, the traditional software algorithm used to enumerate devices has to allocate enough bus numbers for all the bridges that are hot plug capable, expecting more hierarchies to get attached to the hot plug capable bridge. This exposes the problem of scalability of scarce BDF resources. Secondary BDF space can be utilized to enable pre-allocation of portions of a BDF space, without consuming resources in the primary BDF space (the space used and referenced natively by the root complex) until such time as the resources are actually needed (at which time the corresponding mapping into BDF primary space can be established by system software).

The Mapping Portal Bridge (MPB) solves this problem of static (during boot) and dynamic (during hot add and hot remove) Bus, Device and Function resource allocation by creating new Bus, Device and Function hierarchies starting from BDF [0, 0, 0] in each hierarchy. Creating and supporting new BDF spaces (or hierarchies or views of the configuration space) complicates the enumeration of devices under these hierarchies. In one example, the system software can enumerate a PCI Bridge possessing the MPB capability using the traditional enumeration method (e.g., as any other traditional device would be enumerated and within the same BDF space utilized by the root complex). However, if the MPB capability is subsequently enabled (e.g., by the system software), in some instances, the BDF numbers generated by the system software to scan the devices under the MPB capable Bridge may not be valid for devices under the Mapping Portal Bridge (MPB) and may need to be re-enumerated (including the building of a corresponding mapping table). Indeed, as the MPB capability uses a Mapping Table to map the BDF view of the Primary Side (the hierarchy above MPB) to the BDF view of the Secondary Side (the hierarchy below MPB), in some cases, entries in this mapping table will be invalid, for instance, at system reset, until initialized by software. Each entry in the mapping table can be either valid or invalid, and only those entries explicitly initialized by system software may be tagged as "valid" mappings. Because of this, the Primary Side BDF numbers may not be mapped correctly to the Secondary Side BDF numbers. Accordingly, an enhanced enumeration algorithm can be provided to fill this mapping table while also helping to enumerate the devices under the MPB.

In one implementation, an enhanced algorithm for enumerating PCI devices under a Mapping Portal Bridge (MPB) can support the speculative generation of a mapping between a primary and secondary BDF space. The mapping may be speculative, in this context, as the Device/Functions actually present in the system below the MPB may not yet have been found, but the system nonetheless configures the MPB to provide mappings of Device/Functions that may be found at a later state in the enumeration process. If these mappings are actually used, then they would typically be kept, whereas those not used could at some time be "recycled" by the system, e.g. BDFs mapped below one port of a switch might be shifted to be available to another port of the Switch if hardware is hot added below that second port needing more BDFs than initially allocated. Mapping Portal Bridge (MPB) logic can create a new (e.g., secondary) hierarchy of Bus-Device-Function numbers starting from BDF [0, 0, 0]. This is made possible by creating a Mapping Table, which maps the Primary Side BDF (the hierarchy above the MPB) to the Secondary Side BDF (the hierarchy below the MPB). The algorithm uses a speculative approach to create mappings in the Mapping Portal Bridge's BDF Mapping Table. Once these mappings are created, the algorithm uses the traditional PCI enumeration algorithm to enumerate PCI devices under the Mapping Portal Bridge (MPB).

In one example, an enhanced algorithm can build upon the principles of a traditional enumeration algorithm, allowing devices to be enumerated below the MPB in the same way as done traditionally and at other ports not employing a secondary BDF space (e.g., generating configuration transactions to read vendor and device identifiers from the configuration space while performing a tree search of the BDF space below the MPB) making it backwards compatible. As mentioned above, the enhanced algorithm can allow for the Mapping Table to be filled efficiently, using the minimum number of mapping table entries to support a given size of hierarchy below the MPB, while optimizing/maximizing BDF usage on the Primary Side. The algorithm uses simple data structures making its implementation in system software straightforward and simple.

Figure 10A:
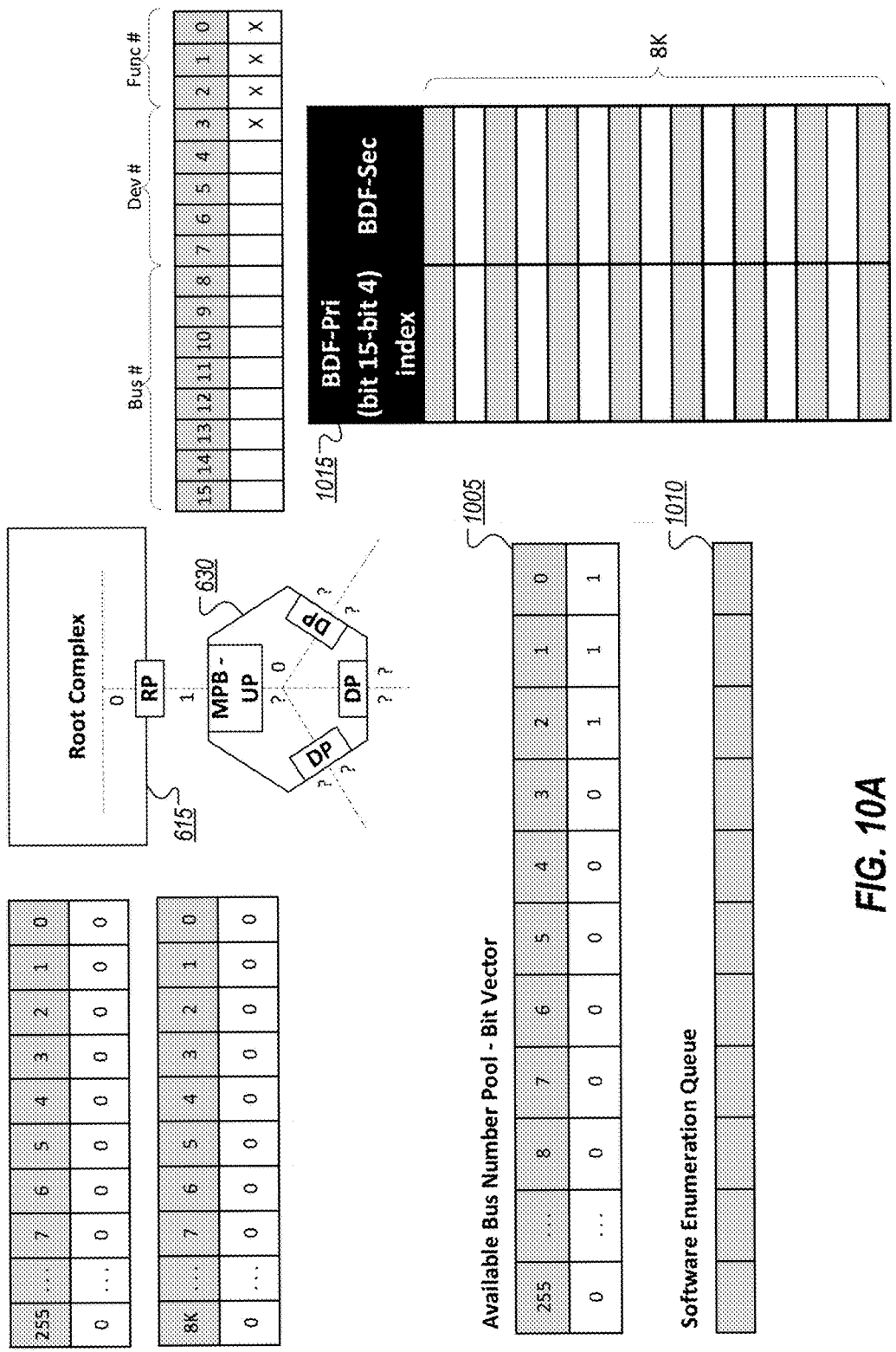
FIGS. 10A-10C are simplified block diagrams illustrating an example technique for enumerating devices within a system.
Figure 10B:
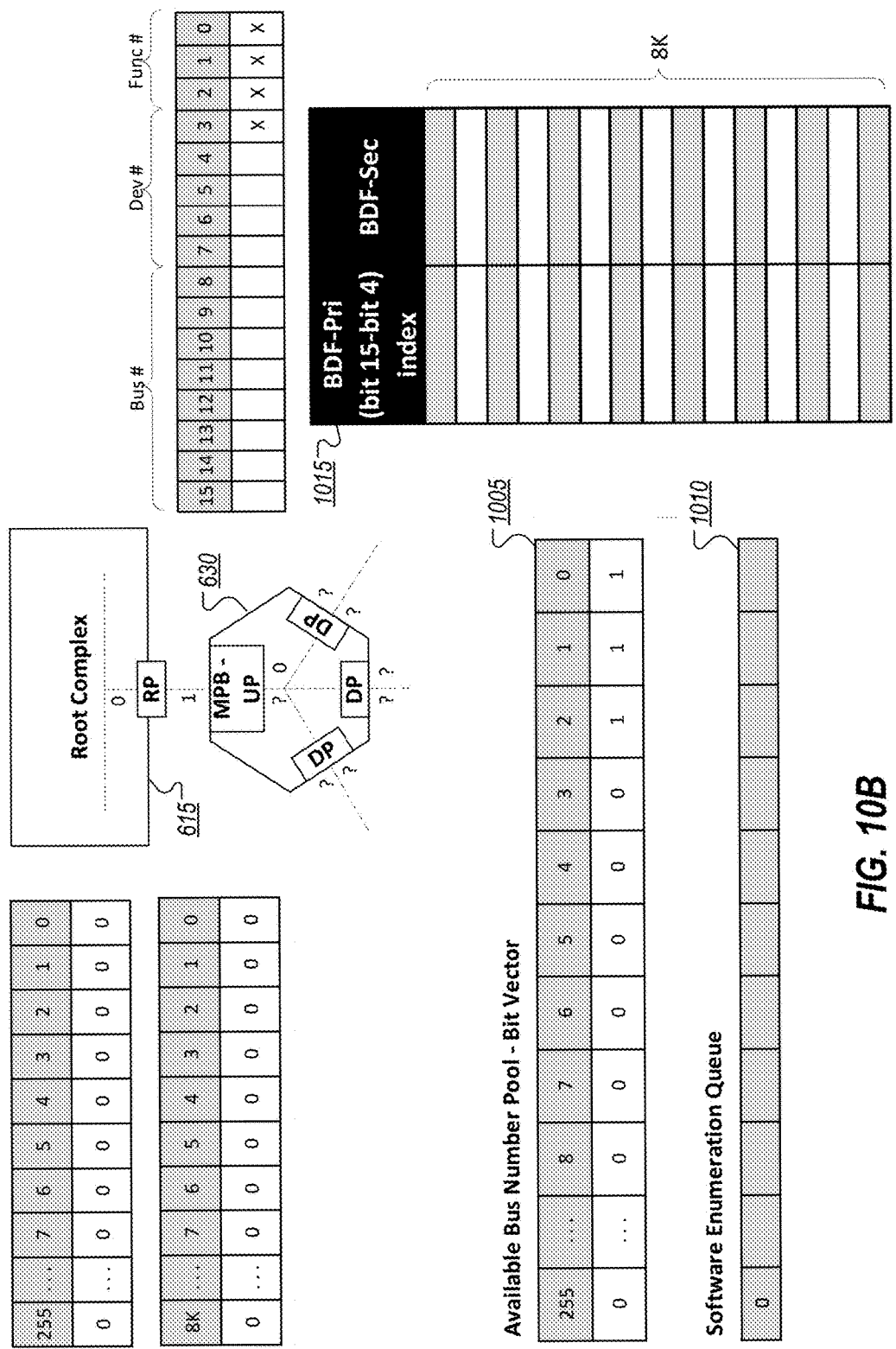
Figure 10C:
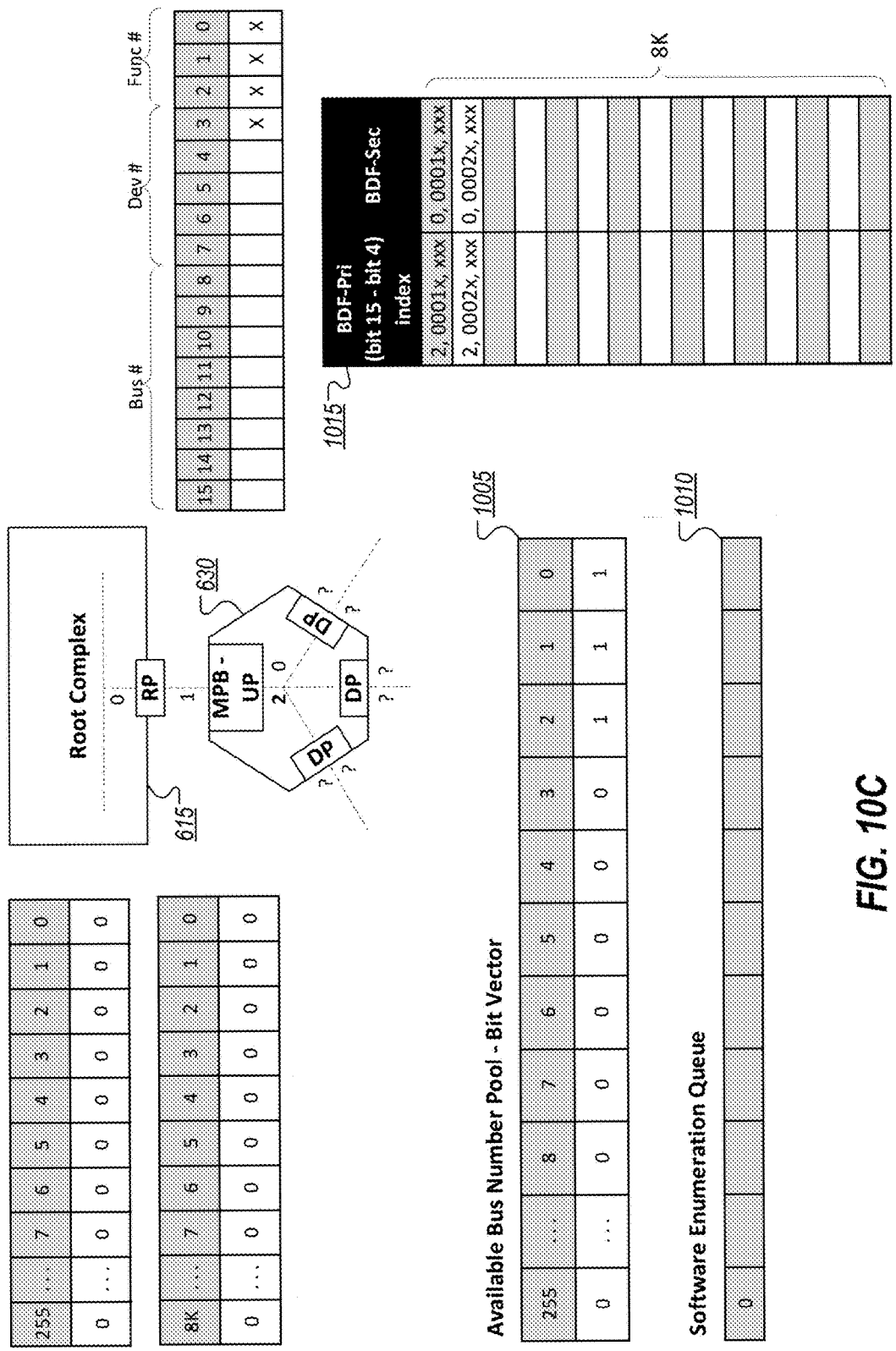

In one example implementation, such as illustrated in the simplified block diagrams 1000a-c of FIGS. 10A-10C, an enhanced algorithm for use in enumerating devices within a secondary BDF space can utilize data structures including, as examples:

A Global Bus Number Pool 1005 (Bit Vector 0-255)—Used to maintain the Bus Number Allocation history on the Primary side of the MPB.

An Enumeration Queue 1010—Used to hold Secondary side bus numbers (e.g., based on a Breadth First Search Algorithm).

As one illustrative example, system software may start enumerating PCI devices connected to ports of a root complex 615 using the traditional algorithm. If system software detects a Type 1 device (e.g., a PCI Bridge) with MPB Capability and if the system software intends to enable the MPB Capability, system software can transition to using the enhanced enumeration algorithm to handle a hierarchy of devices under the MPB. The Enumeration queue 1010 is used to keep track of which bus number on the secondary side needs to be scanned next. This can include the system software first enabling the MPB Capability on the detected Type 1 device. Further, system software can create an empty Mapping Table (e.g., stored in system memory or memory of a port of the MPB. Since the Mapping Table (e.g., 1015) is empty to start with, the traditional enumeration algorithm will not work on devices (e.g., 630) below the MPB Bridge, as no configuration requests will flow from the primary to secondary side of the MPB unless there is a valid mapping in the MPB mapping the target BDF in BDFpri space into BDF sec space.

In one example, the BDF space of a Secondary side hierarchy below a Mapping Portal Bridge (or the view of configuration space within the Secondary side hierarchy space) will always starts from Bus Number 0. In such an implementation, the enhanced algorithm can begin by enqueueing the bus number 0 in the Enumeration Queue 1010 (as shown in FIG. 10B) to reflect the usage of bus number 0 within the Secondary side hierarchy space. The enhanced algorithm can dequeue the Enumeration Queue to indicate the bus number on the secondary side will be scanned next. In order to do the scanning, a speculative mapping will be made between the next available bus number on the primary side and the dequeued bus number on the secondary side. Accordingly, for each bus number dequeued from the Enumeration Queue, the algorithm gets the next available bus number from the Global Bus Number Pool. Then it creates a speculative mapping between the next available bus number from the Global Bus Number Pool and the (potentially multiple) dequeued Secondary side bus number(s), assuming devices are found below the MPB Bridge (e.g., as shown in mapping table 1015 of FIG. 10C).

For each speculative mapping, Configuration read transactions may be generated for all of the device and function numbers under this speculative mapping to convert primary BDFs to secondary BDFs and read the device and vendor IDs using the traditional enumeration algorithm. Likewise, completion of the Configuration read can involve using the mapping to translate the BDF back from BDFsec to BDFpri. During this, if a type 1 device is discovered, then the secondary and subordinate bus numbers are allocated for it and secondary bus number is enqueued in the enumeration queue 1010. And if a type 0 device is found then the required resource for it is allocated.

To illustrate one example, the following pseudocode represents one example implementation of an enhanced algorithm:

```
/* Primary Side Bus Number. Size = 1 Byte.*/
PriBusNum = 0;
/* Secondary Side Bus Number. Size = 1 Byte. Set this to 0 indicating the
first bus number on Secondary side = 0.*/
SecBusNum = 0;
/*Enumeration Queue*/
Queue EnumQueue;
/*Global Primary Side Bus Number Pool.*/
BitVector gPriBusNumPool;
/* Enqueue the first bus number on the Secondary Side.*/
Enqueue(EnumQueue, SecBusNum);
/* Loop until enumeration queue is empty.*/
while (!IsEmpty(EnumQueue))
{
    /* Obtaining the secondary Bus number by dequeueing the
Enumeration queue*/
        SecBusNum = Dequeue(EnumQueue);
    /* Obtaining the next available Bus Number from the Global Bus
Number Pool for the Primary Bus Number */
        PriBusNum = Get Next Available Bus Number from
gPriBusNumPool.
    /*Create a speculative mapping between PriBus, PriDevFunc and
SecBus and SecDevFunc. */
        CreateSpeculativeMapping(PriBusNum, SecBusNum);
    For each Primary Dev,Func Number
    {
        Perform Traditional enumeration by generating Read Config
Transactions to read Vendor and Device ID.
        If (Type1 Device Found)
        {
            Allocate Secondary and Subordinate bus numbers.
            Enqueue(EnumQueue, Allocated Secondary Bus
Number);
        }
        else
        {
            Allocate Required Resources.
        }
    }
}
```

In some implementations, system software can employ "Don't Care" bits to reduce the number of entries in the Mapping Table. For instance, if there are a range of BDFs allocated below an MPB, rather than mapping each BDF individually, a mapping can be built that only applies to some of the bits, implicitly making the non-mapped bits pass through the MPB unmodified. In such implementations, the system software can create speculative mappings for each Bus-Device-Function number combination that falls outside of the "Don't Care" bit mask. For each speculative mapping the system software then uses the traditional enumeration algorithm for all the Bus-Device-Function number combinations that fall under the "Don't Care" mask.

For example, in one implementation, Don't Care bits may be equal to 4. In this specific case, the system software can enumerate two device numbers (each with 8 functions) for each mapping. If the "Don't Care" bits are exhausted then new mappings are created. More rigorous implementations can adopt to re-use the mapping entry if no devices were found under the previously established speculative mapping. Furthermore, multiple bus numbers on the secondary side can be mapped under the same bus number on the primary side. These techniques can be used to maximize the BDF usage on the primary side, while keeping the Mapping Table concise.

Figure 11:
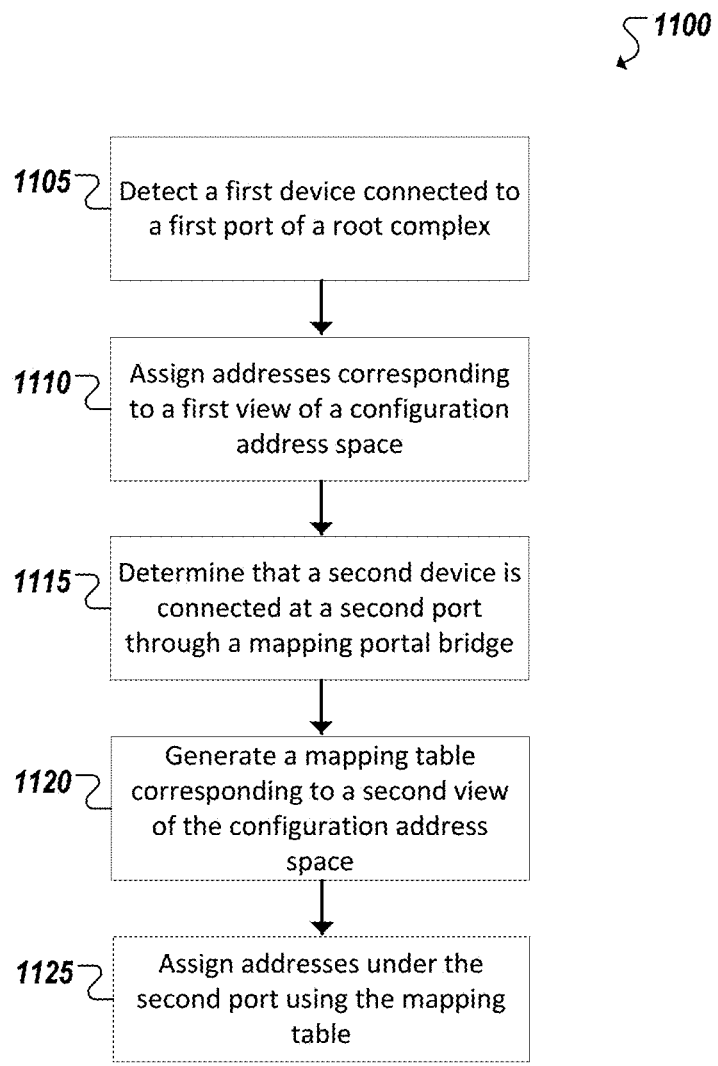
FIG. 11 is a simplified flowchart illustrating an example technique for enumerating devices within a system.

Turning to FIG. 11, a simplified flowchart 1100 is shown illustrating an example technique for enumerating devices within a system. A first device can be detected 1105 at a first port of a root complex. The first device may be part of a first hierarchy. The first device can be enumerated (or "assigned") addresses 1110 according to a first, or primary, view of a configuration space (including other devices in the hierarchy connected to the first port. A second device can be detected 1115 as connected to a second port of the root complex via a mapping portal bridge. The mapping portal bridge can support addressing of a second hierarchy of devices connected under the mapping portal bridge according to a secondary view of the configuration space. In response to detecting the mapping portal bridge connection, a mapping table can be generated 1120 to map addresses in the secondary space to addresses in the primary space. The addresses of the second hierarchy of devices can then be assigned 1125 using the mapping table (e.g., with the root complex and/or system software translating between the primary and secondary space addresses when performing configuration tasks of the address enumeration).

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 12:
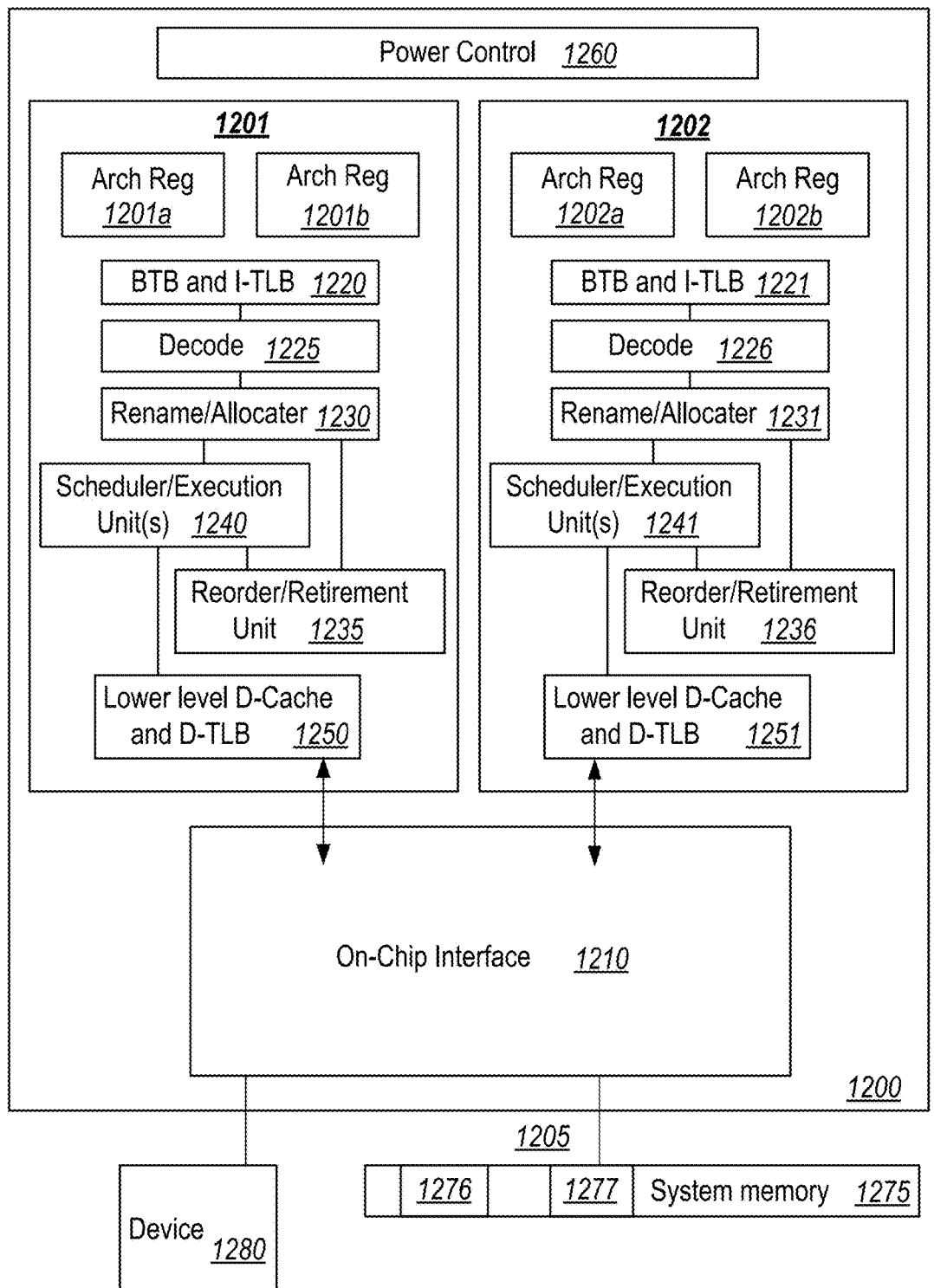
FIG. 12 illustrates an embodiment of a block diagram for a computing system including a multicore processor.

Referring to FIG. 12, an embodiment of a block diagram for a computing system including a multicore processor is depicted. Processor 1200 includes any processor or processing device, such as a microprocessor, an embedded processor, a digital signal processor (DSP), a network processor, a handheld processor, an application processor, a co-processor, a system on a chip (SOC), or other device to execute code. Processor 1200, in one embodiment, includes at least two cores—core 1201 and 1202, which may include asymmetric cores or symmetric cores (the illustrated embodiment). However, processor 1200 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1200, as illustrated in FIG. 12, includes two cores—core 1201 and 1202. Here, core 1201 and 1202 are considered symmetric cores, i.e. cores with the same configurations, functional units, and/or logic. In another embodiment, core 1201 includes an out-of-order processor core, while core 1202 includes an in-order processor core. However, cores 1201 and 1202 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1201 are described in further detail below, as the units in core 1202 operate in a similar manner in the depicted embodiment.

As depicted, core 1201 includes two hardware threads 1201a and 1201b, which may also be referred to as hardware thread slots 1201a and 1201b. Therefore, software entities, such as an operating system, in one embodiment potentially view processor 1200 as four separate processors, i.e., four logical processors or processing elements capable of executing four software threads concurrently. As alluded to above, a first thread is associated with architecture state registers 1201a, a second thread is associated with architecture state registers 1201b, a third thread may be associated with architecture state registers 1202a, and a fourth thread may be associated with architecture state registers 1202b. Here, each of the architecture state registers (1201a, 1201b, 1202a, and 1202b) may be referred to as processing elements, thread slots, or thread units, as described above. As illustrated, architecture state registers 1201a are replicated in architecture state registers 1201b, so individual architecture states/contexts are capable of being stored for logical processor 1201a and logical processor 1201b. In core 1201, other smaller resources, such as instruction pointers and renaming logic in allocator and renamer block 1230 may also be replicated for threads 1201a and 1201b. Some resources, such as re-order buffers in reorder/retirement unit 1235, ILTB 1220, load/store buffers, and queues may be shared through partitioning. Other resources, such as general purpose internal registers, page-table base register(s), low-level data-cache and data-TLB 1215, execution unit(s) 1240, and portions of out-of-order unit 1235 are potentially fully shared.

Processor 1200 often includes other resources, which may be fully shared, shared through partitioning, or dedicated by/to processing elements. In FIG. 12, an embodiment of a purely exemplary processor with illustrative logical units/resources of a processor is illustrated. Note that a processor may include, or omit, any of these functional units, as well as include any other known functional units, logic, or firmware not depicted. As illustrated, core 1201 includes a simplified, representative out-of-order (OOO) processor core. But an in-order processor may be utilized in different embodiments. The OOO core includes a branch target buffer 1220 to predict branches to be executed/taken and an instruction-translation buffer (I-TLB) 1220 to store address translation entries for instructions.

Core 1201 further includes decode module 1225 coupled to fetch unit 1220 to decode fetched elements. Fetch logic, in one embodiment, includes individual sequencers associated with thread slots 1201a, 1201b, respectively. Usually core 1201 is associated with a first ISA, which defines/specifies instructions executable on processor 1200. Often machine code instructions that are part of the first ISA include a portion of the instruction (referred to as an opcode), which references/specifies an instruction or operation to be performed. Decode logic 1225 includes circuitry that recognizes these instructions from their opcodes and passes the decoded instructions on in the pipeline for processing as defined by the first ISA. For example, as discussed in more detail below decoders 1225, in one embodiment, include logic designed or adapted to recognize specific instructions, such as transactional instruction. As a result of the recognition by decoders 1225, the architecture or core 1201 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1226, in one embodiment, recognize the same ISA (or a subset thereof). Alternatively, in a heterogeneous core environment, decoders 1226 recognize a second ISA (either a subset of the first ISA or a distinct ISA).

In one example, allocator and renamer block 1230 includes an allocator to reserve resources, such as register files to store instruction processing results. However, threads 1201a and 1201b are potentially capable of out-of-order execution, where allocator and renamer block 1230 also reserves other resources, such as reorder buffers to track instruction results. Unit 1230 may also include a register renamer to rename program/instruction reference registers to other registers internal to processor 1200. Reorder/retirement unit 1235 includes components, such as the reorder buffers mentioned above, load buffers, and store buffers, to support out-of-order execution and later in-order retirement of instructions executed out-of-order.

Scheduler and execution unit(s) block 1240, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1250 are coupled to execution unit(s) 1240. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1201 and 1202 share access to higher-level or further-out cache, such as a second level cache associated with on-chip interface 1210. Note that higher-level or further-out refers to cache levels increasing or getting further way from the execution unit(s). In one embodiment, higher-level cache is a last-level data cache—last cache in the memory hierarchy on processor 1200—such as a second or third level data cache. However, higher level cache is not so limited, as it may be associated with or include an instruction cache. A trace cache—a type of instruction cache—instead may be coupled after decoder 1225 to store recently decoded traces. Here, an instruction potentially refers to a macro-instruction (i.e. a general instruction recognized by the decoders), which may decode into a number of micro-instructions (micro-operations).

In the depicted configuration, processor 1200 also includes on-chip interface module 1210. Historically, a memory controller, which is described in more detail below, has been included in a computing system external to processor 1200. In this scenario, on-chip interface 1210 is to communicate with devices external to processor 1200, such as system memory 1275, a chipset (often including a memory controller hub to connect to memory 1275 and an I/O controller hub to connect peripheral devices), a memory controller hub, a northbridge, or other integrated circuit. And in this scenario, bus 1205 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1275 may be dedicated to processor 1200 or shared with other devices in a system. Common examples of types of memory 1275 include DRAM, SRAM, non-volatile memory (NV memory), and other known storage devices. Note that device 1280 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1200. For example in one embodiment, a memory controller hub is on the same package and/or die with processor 1200. Here, a portion of the core (an on-core portion) 1210 includes one or more controller(s) for interfacing with other devices such as memory 1275 or a graphics device 1280. The configuration including an interconnect and controllers for interfacing with such devices is often referred to as an on-core (or un-core configuration). As an example, on-chip interface 1210 includes a ring interconnect for on-chip communication and a high-speed serial point-to-point link 1205 for off-chip communication. Yet, in the SOC environment, even more devices, such as the network interface, co-processors, memory 1275, graphics processor 1280, and any other known computer devices/interface may be integrated on a single die or integrated circuit to provide small form factor with high functionality and low power consumption.

In one embodiment, processor 1200 is capable of executing a compiler, optimization, and/or translator code 1277 to compile, translate, and/or optimize application code 1276 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 13:
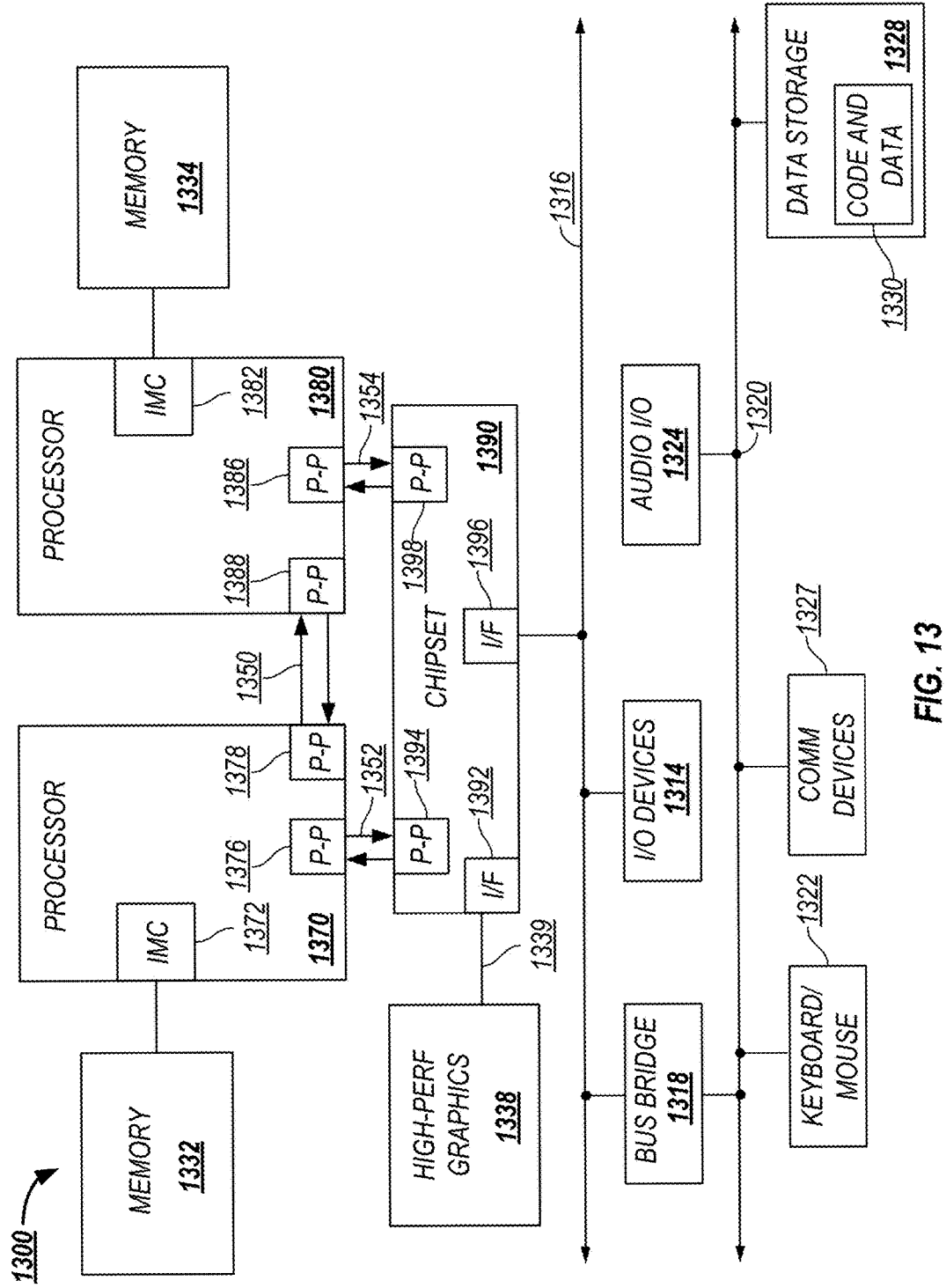
FIG. 13 illustrates another embodiment of a block diagram for a computing system.

Referring now to FIG. 13, shown is a block diagram of a second system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as Intel's Quick Path Interconnect (QPI) architecture. As a result, the invention may be implemented within the QPI architecture.

While shown with only two processors 1370, 1380, it is to be understood that the scope of the present invention is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1 's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

There is disclosed in an example 1, a method, a system, and/or a machine readable storage medium with executable code to determine that at least one first device is connected to a first one of a plurality of ports of a root complex of a system, assign addresses corresponding to a first hierarchy of devices including the first device, determine that a second device is connected through a mapping portal bridge at a second one of the plurality of ports of the root complex, and the second device is included in another second hierarchy of devices, and trigger generation of a mapping table corresponding to the mapping portal bridge. The mapping table defines a translation between addressing used in a first view of a configuration address space of the system and addressing used in a second view of the configuration address space, the first view includes a view of the root complex and the second view includes a view corresponding to the second hierarchy of devices, and the addresses assigned to the first hierarchy of devices are according to the first view.

In example 2, the method, system, and medium of example 1 can optionally also assign addresses for the second hierarchy of devices corresponding to the first view of the configuration address space.

In example 3, in the method, system, and medium of any one of examples 1-2, each of the second hierarchy of devices may optionally also be assigned a respective address according to the second view of the configuration address space.

In example 4, in the method, system, and medium of any one of examples 1-3, addresses of each of the first and second views of the configuration address may optionally be bus-device-function (BDF) numbers.

In example 5, in the method, system, and medium of example 4, the addresses may be optionally assigned according to the first view of the configuration address space are assigned to optimize assignment of bus numbers utilized in the first view.

In example 6, in the method, system, and medium of example 5, the addresses are optionally assigned according to the second view of the configuration address space are assigned according to a different, second address assignment scheme.

In example 7, in the method, system, and medium of example 6, the second scheme may be agnostic to optimizing bus number assignment within the addresses of the second view.

In example 8, in the method, system, and medium of example 4, the configuration address space may optionally include a PCIe configuration address space.

In example 9, in the method, system, and medium of example 4, a first number of bus numbers may optionally be allowed in the first view of the configuration address space, a second number of bus numbers may optionally be assigned in the second view of the configuration address space, a third number of bus numbers may optionally be assigned in the first view of the configuration address space, and a sum of the second and third numbers of bus numbers may exceed the first number.

In example 10, in the method, system, and medium of any one of examples 1-9, the mapping portal bridge may optionally be implemented in a switch device connecting the hierarchy of the devices to the root complex.

In example 11, in the method, system, and medium of any one of examples 1-10, the mapping portal bridge may optionally be implemented in the second port.

In example 12, in the method, system, and medium of any one of examples 1-11, the mapping portal bridge is to use the mapping table to assist communication between the second hierarchy of devices and the root complex.

In example 13, in the method, system, and medium of any one of examples 1-12, devices are optionally discovered in each of the first and second device hierarchies according to a respective search algorithm.

In example 14, in the method, system, and medium of example 13, the search algorithm optionally includes a depth-first search.

In example 15, in the method, system, and medium of example 13, the search algorithm optionally includes a breadth-first search.

In example 16, in the method, system, and medium of example 13, the search algorithm optionally used to discover devices in the first hierarchy is different from the search algorithm used to discover devices in the second hierarchy.

In example 17, in the method, system, and medium of example 13, the search algorithm used to discover devices in the first hierarchy is the same as the search algorithm used to discover devices in the second hierarchy.

In example 18, in the method, system, and medium of any one of examples 1-17, at least a portion of the addresses in the first view of the configuration address space may be reserved for hot plugging.

There is disclosed in an example 19, a system including a root complex including a plurality of ports to couple to a plurality of hierarchies of devices, and system software. The system software may be executable by a processor to: determine that at least one first device is connected to a first one of the plurality of ports; assign addresses corresponding to a first hierarchy of devices including the first device; determine that a second device is connected through a mapping portal bridge at a second one of the plurality of ports of the root complex, and the second device is included in another second hierarchy of devices; and generate of a mapping table corresponding to the mapping portal bridge. The mapping table defines a translation between addressing used in a first view of a configuration address space of the system and addressing used in a second view of the configuration address space, the first view includes a view of the root complex and the second view includes a view corresponding to the second hierarchy of devices, and the addresses assigned to the first hierarchy of devices are according to the first view.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. At least one non-transitory machine accessible storage medium having code stored thereon, the code when executed on a machine, causes the machine to:
   determine that at least one first device is connected to a first one of a plurality of ports of a root complex of a system;
   assign addresses corresponding to a first hierarchy of devices comprising the first device;
   determine that a second device is connected through a mapping portal bridge at a second one of the plurality of ports of the root complex, and the second device is included in another second hierarchy of devices; and
   trigger generation of a mapping table corresponding to the mapping portal bridge, wherein the mapping table defines a translation between addressing used in a first view of a configuration address space of the system and addressing used in a second view of the configuration address space, the first view comprises a view of the root complex and the second view comprises a view corresponding to the second hierarchy of devices, and the addresses assigned to the first hierarchy of devices are according to the first view;
   wherein the generation of the mapping table comprises a speculative mapping between the addressing used in the first view of the configuration address space and the addressing used in the second view of the configuration address space, the speculative mapping comprising:
      enqueuing from an enumeration queue a first value representative of an address for the second hierarchy of devices;
      identifying a second value representative of an address for the second hierarchy of devices by dequeuing the enumeration queue; and
      mapping the second value to an address for the first hierarchy of devices.

2. The storage medium of claim 1, wherein the code is further executable to assign addresses for the second hierarchy of devices corresponding to the first view of the configuration address space.

3. The storage medium of claim 2, wherein each of the second hierarchy of devices is also assigned a respective address according to the second view of the configuration address space.

4. The storage medium of claim 1, wherein addresses of each of the first and second views of the configuration address comprise respective bus-device-function (BDF) numbers.

5. The storage medium of claim 4, wherein the addresses assigned according to the first view of the configuration address space are assigned to optimize assignment of bus numbers utilized in the first view.

6. The storage medium of claim 5, wherein the addresses assigned according to the second view of the configuration address space are assigned according to a different, second address assignment scheme.

7. The storage medium of claim 6, wherein the second scheme is agnostic to optimizing bus number assignment within the addresses of the second view.

8. The storage medium of claim 4, wherein the configuration address space comprises a Peripheral Component Interconnect (PCI) Express (PCIe)-based configuration address space.

9. The storage medium of claim 4, wherein a first number of bus numbers are assigned in the first view of the configuration address space, a second number of bus numbers are assigned in the second view of the configuration address space, a third number of bus numbers are assigned in the first view of the configuration address space, and a sum of the second and third numbers of bus numbers exceeds the first number.

10. The storage medium of claim 1, wherein the mapping portal bridge is implemented in a switch device connecting the hierarchy of the devices to the root complex.

11. The storage medium of claim 1, wherein the mapping portal bridge is implemented in the second port.

12. The storage medium of claim 1, wherein the mapping portal bridge is to use the mapping table to assist communication between the second hierarchy of devices and the root complex.

13. The storage medium of claim 1, wherein the code is further executable to discover devices in each of the first and second device hierarchies according to a respective search algorithm.

14. The storage medium of claim 13, wherein the search algorithm comprises a depth-first search.

15. The storage medium of claim 13, wherein the search algorithm comprises a breadth-first search.

16. The storage medium of claim 13, wherein the search algorithm used to discover devices in the first hierarchy is different from the search algorithm used to discover devices in the second hierarchy.

17. The storage medium of claim 13, wherein the search algorithm used to discover devices in the first hierarchy is the same as the search algorithm used to discover devices in the second hierarchy.

18. The storage medium of claim 1, wherein at least a portion of the addresses in the first view of the configuration address space are reserved for hot plugging.

19. A method comprising:
   determining that at least one first device is connected to a first one of a plurality of ports of a root complex of a system;
   assigning addresses corresponding to a first hierarchy of devices comprising the first device;
   determining that a second device is connected through a mapping portal bridge at a second one of the plurality of ports of the root complex, and the second device is included in another second hierarchy of devices; and
   triggering generation of a mapping table corresponding to the mapping portal bridge, wherein the mapping table defines a translation between addressing used in a first view of a configuration address space of the system and addressing used in a second view of the configuration address space, the first view comprises a view of the root complex and the second view comprises a view corresponding to the second hierarchy of devices, and the addresses assigned to the first hierarchy of devices are according to the first view;
      wherein the generation of the mapping table comprises a speculative mapping between the addressing used in the first view of the configuration address space and the addressing used in the second view of the configuration address space, the speculative mapping comprising:
         enqueuing from an enumeration queue a first value representative of an address for the second hierarchy of devices;
         identifying a second value representative of an address for the second hierarchy of devices by dequeuing the enumeration queue; and
      mapping the second value to an address for the first hierarchy of devices.

20. A system comprising:
   a root complex comprising a plurality of ports to couple to a plurality of hierarchies of devices;
   system software, executable by a processor, to:
      determine that at least one first device is connected to a first one of the plurality of ports;
      assign addresses corresponding to a first hierarchy of devices comprising the first device;
      determine that a second device is connected through a mapping portal bridge at a second one of the plurality of ports of the root complex, and the second device is included in another second hierarchy of devices; and
      generate a mapping table corresponding to the mapping portal bridge, wherein the mapping table defines a translation between addressing used in a first view of a configuration address space of the system and addressing used in a second view of the configuration address space, the first view comprises a view of the root complex and the second view comprises a view corresponding to the second hierarchy of devices, and the addresses assigned to the first hierarchy of devices are according to the first view;
   wherein the generation of the mapping table comprises a speculative mapping between the addressing used in the first view of the configuration address space and the addressing used in the second view of the configuration address space, the system software to speculatively map by:
   enqueuing from an enumeration queue a first value representative of an address for the second hierarchy of devices;
   identifying a second value representative of an address for the second hierarchy of devices by dequeuing the enumeration queue; and
   mapping the second value to an address for the first hierarchy of devices.

* * * * *